Jan. 3, 1939.  J. H. CANNON  2,142,492
TIME RECORDER
Filed Dec. 20, 1933  4 Sheets-Sheet 1
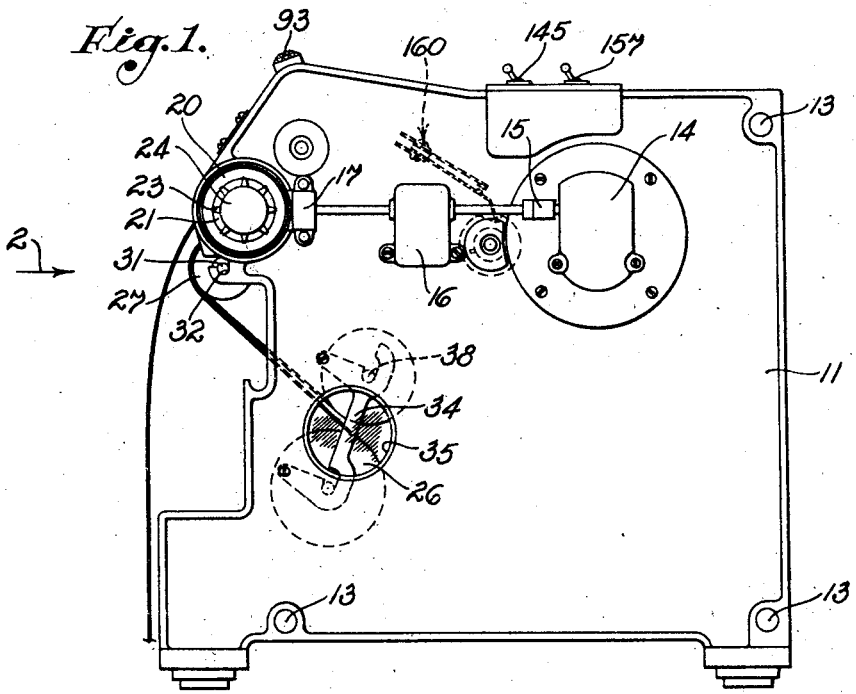
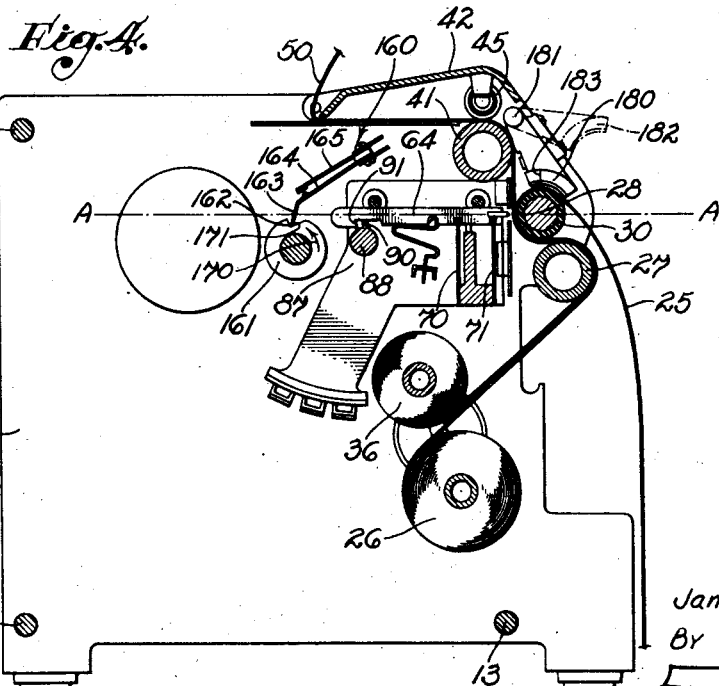
INVENTOR:
James H. Cannon,
By
Fred W. Lamm
ATTORNEY.

Jan. 3, 1939.  J. H. CANNON  2,142,492
TIME RECORDER
Filed Dec. 20, 1933  4 Sheets-Sheet 2
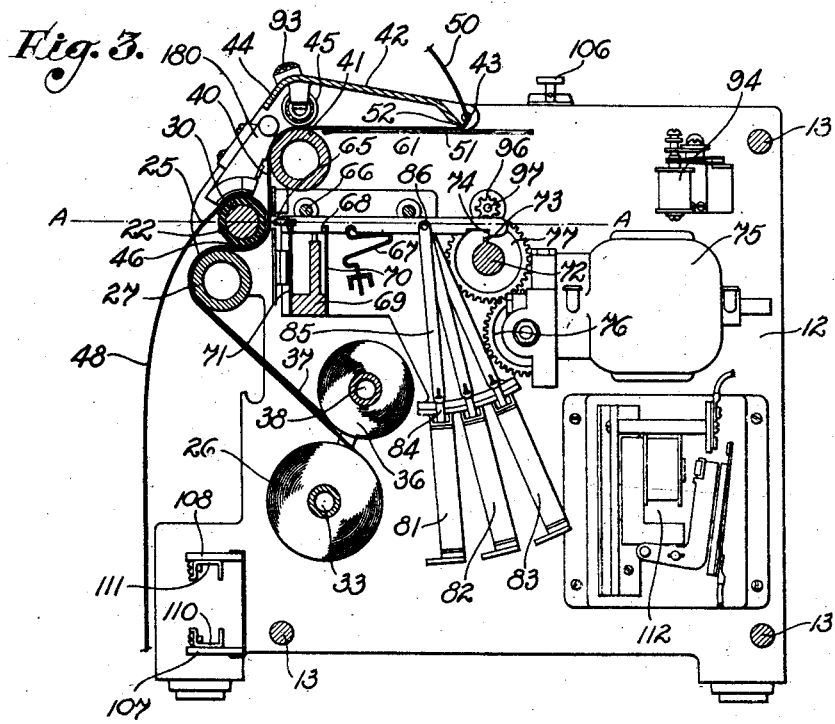
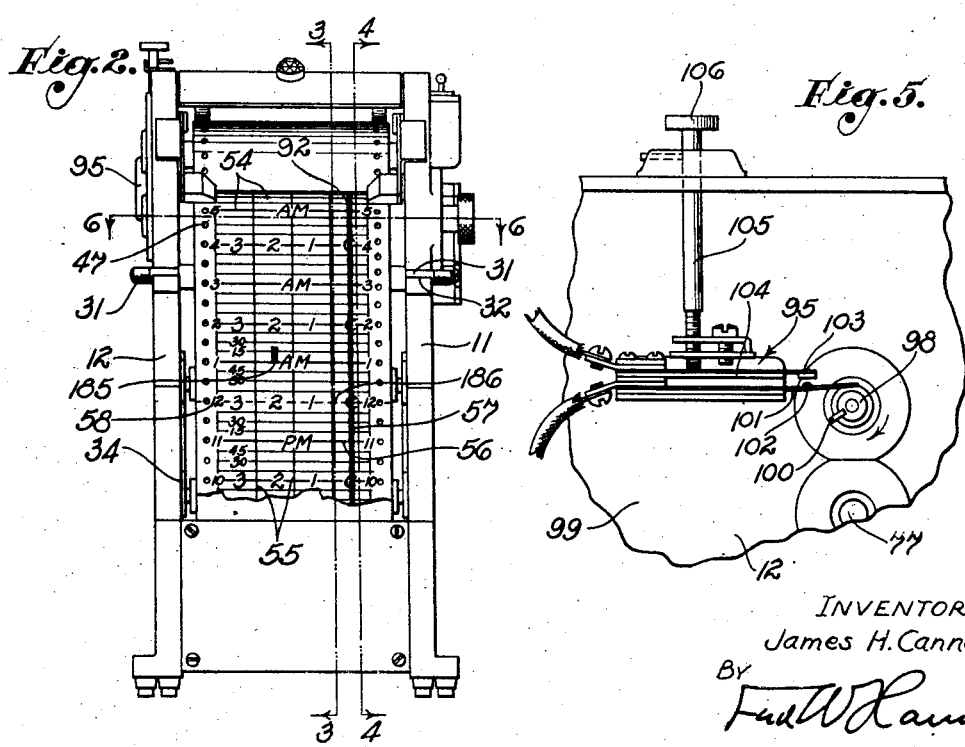
INVENTOR:
James H. Cannon,
BY
Fred W Lamin
ATTORNEY.

Jan. 3, 1939.  J. H. CANNON  2,142,492
TIME RECORDER
Filed Dec. 20, 1933  4 Sheets-Sheet 3

INVENTOR:
James H. Cannon,
By

ATTORNEY.

Jan. 3, 1939.  J. H. CANNON  2,142,492

TIME RECORDER

Filed Dec. 20, 1933  4 Sheets-Sheet 4

Fig. 7.

INVENTOR:
James H. Cannon,
BY
ATTORNEY.

Patented Jan. 3, 1939

2,142,492

UNITED STATES PATENT OFFICE 2,142,492

TIME RECORDER

James H. Cannon, Los Angeles, Calif.

Application December 20, 1933, Serial No. 703,233

2 Claims. (Cl. 234—27.5)

My invention relates to signal systems and relates in particular to a signal system having an improved type of recorder for making a complete and accurate record of the operation of the various signals constituting the signal system.

Although the invention may be employed in conjunction with various recording and signaling devices an extensive use thereof is in conjunction with signal systems of the character employed in hospitals wherein devices are placed in the respective rooms or wards for causing the operation of a signal at a signal station to constitute a call for an attendant. Many of such signal systems comprise merely a simple light drop, or equivalent means, for showing that the signal actuating means situated at the bedside of a patient has been operating. For protection of both the hospital and the patient it is highly desirable to provide a means for keeping a complete record of the operation of these signal devices, such record showing the time at which the signal was actuated and the length of time taken to respond to the call for an attendant. It is an object of my invention to provide an improved recorder having a record, means for showing whether or not the recording device has been in continuous operation, and means for showing the time and duration of operation of the various signals constituting the entire signal system.

It is a further object of my invention to provide a recorder having a record and means for producing recordings or indications on such record when the associated signals are operated, the recording means being power operated through an electric circuit or from a source of current supply separate from the individual signal circuits. These signal circuits are often of considerable length and are generally operated on low voltages, with the result that a voltage drop will often interfere with the proper operation of the ordinary type of recording device. In my new system and recorder perfect operation is maintained under ordinary conditions.

Further objects and advantages of the invention will be made evident throughout the following part of the specification.

Referring to the drawings which are for illustrative purposes only:

Fig. 1 is a view of the right side of a recorder embodying my invention.

Fig. 2 is a front view of the recorder taken as indicated by the arrow 2 of Fig. 1.

Fig. 3 is a cross-section on a plane represented by the line 3—3 of Fig. 2.

Fig. 4 is a section taken as indicated by the line 4—4 of Fig. 2.

Fig. 5 is an enlarged fragmentary view showing the details of the buzzer switch forming a part of the invention.

Fig. 7 is an electrical diagram showing the manner of connecting the recorder with the signal system.

Figure 6:
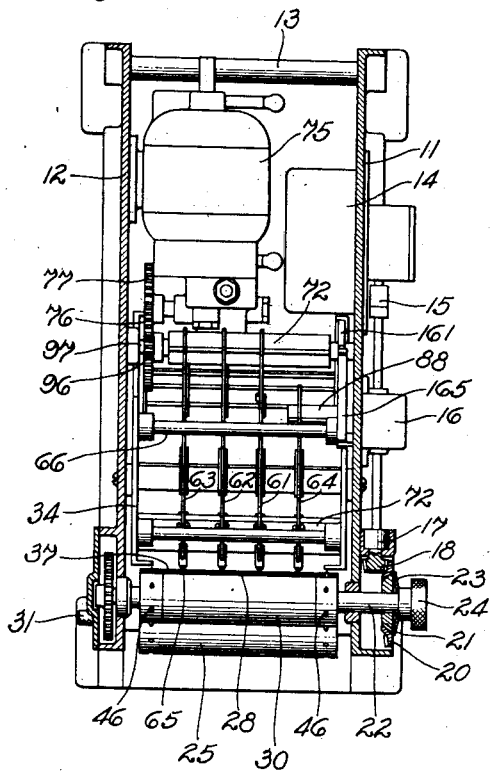
Fig. 6 is a cross-section on a plane represented by the line 6—6 of Fig. 2.

The simple form of my recorder shown in the drawings employs right hand and left hand side plates 11 and 12 which are disposed in parallel planes and are spaced apart in accordance with the number of recording units to be mounted therein. These side plates are held together by use of cross bars 13. Mounted on the exterior face of the side plate 11, as shown in Fig. 1, is a chronometric device preferably in the form of a synchronous clock motor 14 adapted to drive a shaft 15 at relatively slow speed. This shaft 15 extends through a gear case 16 to a gear case 17 where it drives a pinion bevel gear 18 meshed with a bevel gear 20 secured to a friction plate 21 turnably mounted upon a drive roller shaft 22 which is provided with a cooperating friction plate 23 and a knob 24 whereby the roller may be independently turned for the purpose of adjusting to a starting position a record 25 which consists of a strip of paper which passes from a supply roll 26, over an idling roller 27 and around the inner face 28 of a drive roller 30 mounted on the shaft 22.

As will be noted, the roller 30 extends across the upper forward or leftward part of the supporting structure formed by the side plates 11 and 12 and the interconnecting rods 13 and is consequently essentially in a horizontal plane with the timing motor 14. The idling roller 27 is removably secured in its operative position shown in Fig. 3 by extending trunnions 31 which are adapted to engage notches or channels 32 formed at the forward edges of the side plates 11 and 12. The supply roll 26 is supported on a pin 33, the ends of which are adapted to engage plates 34 carried on the inner faces of the side walls 11 and 12, one of the plates 34 passing an opening 35 in the side plate 11, which opening provides a means for viewing the roll 26 to check up on the size thereof. A roll 36 of carbon paper 37 is carried on a pin 38 between the upper ends of the plates 34, this sheet of carbon paper also being carried over the idler roll 27 and across the outer or rightward face of that portion of the record 25 which passes upwardly over the inner face 28 of the roller 30. At the roller 30 the record 25 curves forwardly and downwardly on the exterior of the recording device in a position for inspection or for subsequent removal, as shown in Fig. 3. As shown at 40 the carbon paper is carried vertically from the rear face 28 of the roller 30 to a roller 41 which has a smooth outer face and which is driven at such speed that its periphery will travel slightly faster than the surface of the roller 30. A plate 42 extends across the space between the upper parts of the side plates 11 and 12 and has hinge means 43 at its rearward end so that the forward end 44 thereof may be swung upwardly. Under the forward end 44 of the plate 42 rollers 45 are resiliently mounted, which rollers 45 hold the carbon paper 37 against the rotating roller 41 so that a constant pull will be placed upon the carbon paper to stretch the portion 40 thereof tight. The ends of the roller 30 are provided with sprockets 46 which engage sprocket holes 47 in the edges of the record sheet 25 and the sheet of carbon paper 37 so that such sheets are positively driven when the timing motor 14 is in operation. Accordingly, during the operation of the timing motor both sheets 25 and 37 will be fed chronometrically through the recording device, the end 48 of the record sheet 25 passing downwardly across the face of the recording device and the end 50 of the carbon paper 37 passing rearwardly over a horizontal plate 51 and under a tearing edge 52 formed at the rear of the swingable cover plate 42, so that this extending end 50 may be torn off at intervals. As shown in Fig. 2, the record sheet 25 has lengthwise paths 54 defined thereon by lines 55, these paths 54 being designated as numbers 1, 2, 3, etc. in accordance with the number of signal stations employed in the signal system which the recorder is to serve. One of the paths, such as the one at the right hand side of the record sheet 25, is designated by the character C and has the function of receiving a continuous record to show whether or not the recording device operates throughout the whole of a given twenty-four hour period. Lateral lines 56 are employed to indicate hour divisions of time and lateral lines 57 are employed to designate fifteen minute intervals, it being understood that the lines 56 and 57 are spaced at such distance that the rotation of the roller 30 will cause them to pass a given point at intervals of time 58.

For producing recordings or indications on the record sheet 25 a plurality of printing members 61, 62, 63 and 64 are provided, these printing members each consisting of a flat bar having a chisel-shaped printing point 65 mounted at the forward end thereof. These printing members 61 to 64 are disposed in side by side relation in a horizontal plane A—A and are held upwardly against horizontal cross bars 66 which extend between the side plates 11 and 12, by spring members 67. Notches 68 formed in the lower edges of the members 61 to 64 are engaged by vertically disposed leaf springs 70 and 71, the lower ends of which are secured to a horizontal bar 69. Accordingly, as the members 61 to 64 move lengthwise in the horizontal plane A—A the upper portions of the leaf springs 70 and 71 flex. The springs 70 and 71 are so placed as to hold the members 61 to 64 normally in such position that the heads 65 thereof will rest adjacent the carbon paper 37 where it passes over the inner face 28 of the roller 30. For actuating the printing members 61, 62 and 63 I provide a rotary member 72 disposed on a horizontal axis in crossing relation to the members 61, 62 and 63. A projecting dog or rib 73 on the exterior of the member 72 is adapted to engage a shoulder 74 formed at the rearward end of each printing member 61, 62 and 63. When the members 61—63 are in their normal positions, or inactive positions, as shown in Fig. 3, the dog 73 will pass below the shoulder 74, as the member 72 is rotated by an electric motor 75 through the use of gears 76 and 77. Should it be desired to actuate a printing member 61—63, it is necessary to swing the rearward end of the desired member downwardly so as to bring the shoulder 74 thereon into the clockwise path of movement of the dog 73, whereupon the dog will force rightwardly or rearwardly, Fig. 3, on the engaged shoulder 74 and will carry the printing member rearwardly, flexing at this time the springs 67, 70 and 71 associated therewith. When the dog 73 moves a sufficient distance rightwardly and downwardly from the position in which it is shown in Fig. 3, it will disengage the shoulder 74 so that the springs 70 and 71 will be permitted to snap the printing member leftwardly, causing the printing head 65 thereon to strike against the carbon paper and to transfer pigment from the carbon paper onto the surface of the record sheet 25.

For the purpose of moving the members 61—63 from inactive positions as shown in Fig. 3 to active positions wherein a printing operation thereof will be caused, I provide magnetic devices in the form of solenoids 81, 82 and 83, which are disposed below the horizontal plane A—A in staggered relation and which have armatures 84 connected respectively to the printing members 61, 62 and 63 by use of links 85, the upper ends of which are secured by pivot means 86 to the proper printing members 61, 62 and 63. Energization of one or more of these solenoids 81—83 will cause one or more of the printing members 61—63 to be swung downwardly so that the shoulder 74 at the rearward ends thereof will be in position to be engaged by the dogs 73 of the rotary member 72.

On the inner face of the side plate 11 is a gear case 87 having a projecting rotary member 88 carrying a dog 90 adapted to engage a shoulder 91 formed in the printing member 64. This rotary member 88, however, is in such position that the dog 90 thereof will engage the shoulder 91 at each anti-clockwise revolution of the member 88. The gear case 16 shown in Fig. 1 communicates with the gear case 87 of Fig. 4, and gear means are provided therein whereby the shaft 15 will continuously drive the rotary member 88 when the timing motor is in operation. Accordingly, when the recording device is turned on, the continuous rotation of the member 88 will cause the dog 90 to intermittently engage the shoulder 91 so as to carry the member 64 rearwardly or leftwardly, as shown in Fig. 4, subsequently releasing the same so that consecutive printing strokes in rightward direction will be accomplished with the result that the record 25, as shown in Fig. 2, will contain a continuous line of recordings 92 in the lane or path C to indicate the extent of time during which the record 25 is in motion. In addition to this I provide sensible means for indicating that the recording device is in operation, consisting of a lamp 93 and a buzzer 94 which may be periodically energized through use of a switch mechanism 95 shown in detail in Fig. 5. As shown in Fig. 3 a small gear 96 is mounted in a position to engage the gear 77, on a shaft 97 which projects through the side plate 12 so as to carry a rotary member 98 on the outer face 99 of the side plate 12. This rotary member has a lug or cam 100 thereon adapted to engage a leaf spring 101 carrying a contact 102 in a position to engage a second contact 103 carried by a leaf spring 104 which is adapted to be adjusted upwardly or downwardly by use of an adjusting screw 105 having an exposed thumb knob 106 for the operation thereof. Whenever the motor 75 is energized so as to drive the gear 77, the cam 100 will rotate in clockwise direction and will periodically lift the rightward end of the leaf spring 101 so as to cause engagement of the contacts 102 and 103, whereupon the buzzer 94 will be periodically energized through conductors which will be hereinafter identified in conjunction with the description of the wiring diagram, Fig. 7. By raising or lowering the spring 104 the length of time the contacts 102 and 103 remain in engagement may be varied so as to change the duration of the sounding of the buzzer 94.

Mounted in the lower forward part of the device, in the position between the side plates 11 and 12 are bars 107 and 108 of insulating material carrying electrical contact terminals 110 and 111 providing a means for connecting external wiring to the recorder. Also, in the recorder a magnetic relay 112 may be mounted for controlling the operation of the motor 75 in a manner to drive the rotary member 72 during the time any one of the solenoids 81, 82 or 83 is energized, this relay 112 being used in the preferred practice of my invention and where the motor 75 is not continuously operated.

The simple signal system shown in Fig. 7 has a plurality of stations S, individually identified as $S^1$, $S^2$ and $S^3$, each including a switch 113 having a pair of contacts 115 and 116 connected to a feeder or conductor 117 which is connected to the terminal 118 of a source of electric current represented by a transformer 120. When each switch 113 is actuated the contacts 115 and 116 thereof respectively connect with cooperating contacts 121 and 122. At a suitable signal receiving station signal means are placed, which may include lamps $L^1$, $L^2$ and $L^3$ corresponding to the stations $S^1$, $S^2$ and $S^3$, together with other signal means such as a buzzer 123 and a main pilot lamp 124 which will be illuminated when any one of the lamps $L^1$, $L^2$ and $L^3$ are lighted. A conductor 125 connects the contact 121 of station $S^1$ with one terminal of the lamp $L^1$, a conductor 126 connects the contact 121 of the station $S^2$ with one terminal of the lamp $L^2$, and a conductor 127 connects the contact 121 of the station $S^3$ with one terminal of the lamp $L^3$. All of the contacts 122 are connected to a conductor 128 which has a conductor 129 leading therefrom to the buzzer 123 and the lamp 124. Also, the conductor 128 may connect through a switch 130 with a buzzer 131 placed at a remote point, such as in the diet kitchen, to advise an attendant who has temporarily left the signal station that a signal has been operated, so that such attendant may return to the signal receiving station to determine from the lamps $L^1$ etc. which of the switches 113 has been operated. A conductor 132 connects the remaining terminals of the lamps $L^1$, $L^2$ and $L^3$ and 124 and the buzzer 123 with a conductor 133, which connects with the terminal 134 of the power source 120. It is to be noted that the buzzers 123 and 131 are actuated through circuits controlled by the switch contacts 116 and 122 and that the lamps $L^1$, $L^2$ and $L^3$ are energized through circuits controlled by contacts 115 and 121. The solenoids 81, 82 and 83, previously shown in Fig. 3, are connected in parallel with the lamps $L^1$, $L^2$ and $L^3$ by use of conductors 135, 136 and 137 which connect respectively to the conductors 125, 126 and 127. The circuits through the respective solenoids are completed by use of a conductor 138 which connects with the power return line or conductor 133.

From the foregoing it will be perceived that should the motor 75 be in operation so as to drive the rotary member 77, the operation of the switch 113 at any one of the signal stations S will result in the energization of a solenoid 81, 82 or 83, and the proper lever 61, 62 or 63 will be moved so as to be engaged by the cam or dog 73, as previously described. It is not necessary, however, to have the motor 75 in continuous operation and accordingly in Fig. 7 I show a conductor 140 connecting the conductor 128 with one terminal 141 connecting with the coil 142 of the relay switch 112. From the other terminal 143 of the coil 142 a conductor 144 is carried to a switch 145 by which it may be connected to the return line 133. For operation of the timing motor 14 and the motor 75 a separate conductor 146 is carried from the positive terminal 118 of the power source 120 to a contact 147 of the relay switch 112. By use of conductors 148 and 150 the timing motor 14 is bridged across the conductors 144 and 146, the result being that when the switch 145 is closed the timing motor 14 will be energized and the motor 75 may be energized under control of the relay switch 112.

For energization of the motor 75 a conductor 151 is carried from the second contact 152 of the switch 112 to a terminal 153 of the motor 75 and from the terminal 154 of such motor a conductor 155 is carried to the conductor 144. The lamp 93 is bridged across the motor circuit so that such lamp 93 will be illuminated during the energization of the motor 75, and likewise the buzzer 94 and its intermittent switch means 95 are connected in a circuit 156 bridged across the motor 75 and preferably containing a manual control switch 157. The operation of this part of the device is as follows:

With the switch 145 closed, as is its condition when the recording device is in operation, the closing of any switch 113 will result in energization of the magnet coil 142 through conductors 140 and 144, thereby closing the switch 112 so as to connect contacts 147 and 152 thereof, whereupon the operating motor 75, and the electrical devices bridged thereacross, will be energized through conductors 144 and 146, and the switch 112 will remain in closed condition as long as a switch 113 is closed. Accordingly, a proper solenoid 81, 82 or 83 will at this time be energized to hold a proper printing member in operative condition and the rotary member 72 will be driven to cause a printing movement of the actuated printing member. To insure a recording operation even though a switch 113 at a station S should be closed for a very short period of time I provide a means for sustaining the rotation of the rotary member 72 after the opening of the switch 112, sufficiently to bring the dog 73 into a starting position such as that in which it is shown in Fig. 3, such means being in the form of a motor circuit sustaining switch 160 comprising, as best shown in Fig. 4, a circular cam 161 mounted on the end of the rotary member 72 adjacent the side plate 11, this cam having a notch 162 therein into which a switch closing member 163 formed on the end of a leaf spring 164 may drop when the dog 73 of the rotary member 72 is in a position closely approaching the shoulders 74 of the members 61—63. Adjacent the leaf spring 164 is a cooperating spring contact 165. The leaf spring 164 is connected through a conductor 166 with the conductor 146 and the cooperating contact 165 is connected through a conductor 167 with the conductor 151 leading to the motor 75, the result being that with the parts of the recording device in normal inoperative position as shown in Fig. 3, the momentary closing of the switch 113 will result in a momentary energization of the motor 75, with the result that the cam 161 will be moved in the direction of the arrow 170 of Fig. 4, so that the shoulder 171 of the notch 162 will lift the engagement member 163 and close the switch consisting of the members 164 and 165. Accordingly, the motor 75 will be energized through the switch means 160 and a single revolution of the rotary member 72 and a single printing operation will be assured even though the switch 112 should be immediately opened. It will be noted that the angularity of the shoulder 74 of each of the members 61, 62, and 63, and the angularity of the engaging face of the dog 73 relative to the axis of the rotary member 72 is such that the frictional engagement therebetween is sufficient to prevent disengagement of the shoulder and the dog when they are once engaged until the printing member has been actuated at least once even though the solenoids 81, 82, or 83 should be de-energized before the completion of the printing movement.

For holding the record sheet 25 in engagement with the roller 30 I provide arcuate weight members 180, Figs. 3 and 4, pivoted at 181 above the ends of the roller 30 so as to be swingable into raised position such as indicated by dotted lines 182. A setting mark 183 may be provided on one or both the weight members 180 in such position that when one of the lateral lines 56 or 57 on the record sheet 25 is in alignment therewith another of the lateral lines 56 or 57 will be in the plane A—A facing the ends of the printing heads 65. The distance between the ends of the printing heads 65 and the mark 183 may be one-half hour, for example, and after the record sheet 25 is placed over the roller 30, the roller 30 may be turned by use of the knob 24 to bring the lateral lines 56 and 57 into proper position in accordance with the actual time of day at which the setting is being made. For example, should the device be set at 12:30 p. m., lateral line 56 designated by the numeral 12 will be brought into alignment with the indicating mark 183, thereby assuring that the lateral line 57 indicating 12:30 will be in a printing position in the plane A—A. Through the friction clutch represented by the plates 21 and 23 the roller 30 will be thereafter driven synchronously and the operation of the various signals will result in the production of recording marks 185 in the lanes or paths 54 of the record sheet 25 which may have perforations 186 at twenty-four hour divisions, so that sections each representing a twenty-four hour record may be readily torn off after they issue from the recording device.

Although I have shown a simple and operative form of my invention, it will be recognized that certain parts or elements thereof are representative of other parts having equivalent function and that accordingly the invention is not limited to the foregoing disclosure but should be accorded the full scope of the appended claims.

I claim as my invention:

1. In a device of the character described, the combination of recording means with a time-actuated record-receiving means, said recording means including: a plurality of marking bars in side-by-side relation; means for yieldably supporting said bars in positions of rest relative to said recording means; yielding means for resisting movement of said bars in a direction away from said record-receiving means; a catch on each of said bars; a rotary member having a dog thereon for engaging said catches; means to actuate said rotary member; and electromagnetic means for selectively moving said catches into position for engagement with said dog.

2. In a device of the class described, the combination with a time-actuated record-receiving means of recording means, said recording means including: a plurality of signal circuits; a plurality of corresponding marking bars in side-by-side relation; means for yieldably supporting said bars in positions of rest relative to said record-receiving means; yieldable means for resisting movement of said bars in a direction away from said recording means; a catch on each of said bars; a rotary member having a dog thereon for engaging said catches; a motor for driving said rotary member; a motor circuit for energizing said motor; means operative in consequence of the closing of any of said signal circuits to close said motor circuit; a hold-over switch associated with said rotary member for maintaining said motor circuit closed until said rotary member has completed a prescribed cycle of operation; and a plurality of magnetic means adapted to be energized by said corresponding circuits for selectively moving said catches into position for engagement with said dog.

JAMES H. CANNON.